E. M. STORY.
PNEUMATIC TIRE.
APPLICATION FILED NOV. 10, 1919.
1,336,663.
Patented Apr. 13, 1920.
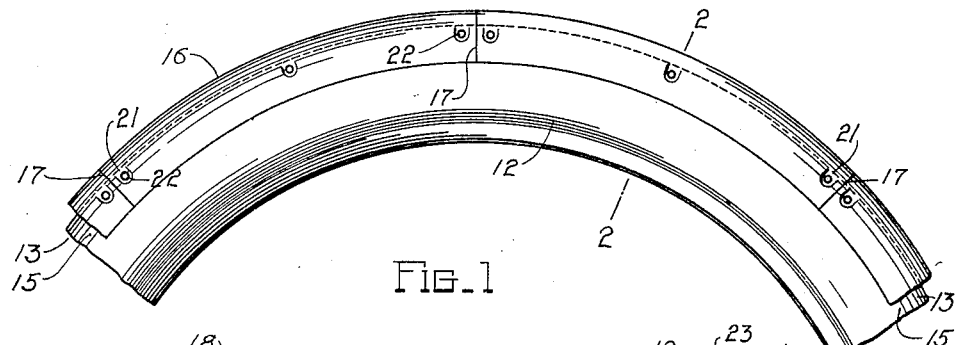
Fig. 1
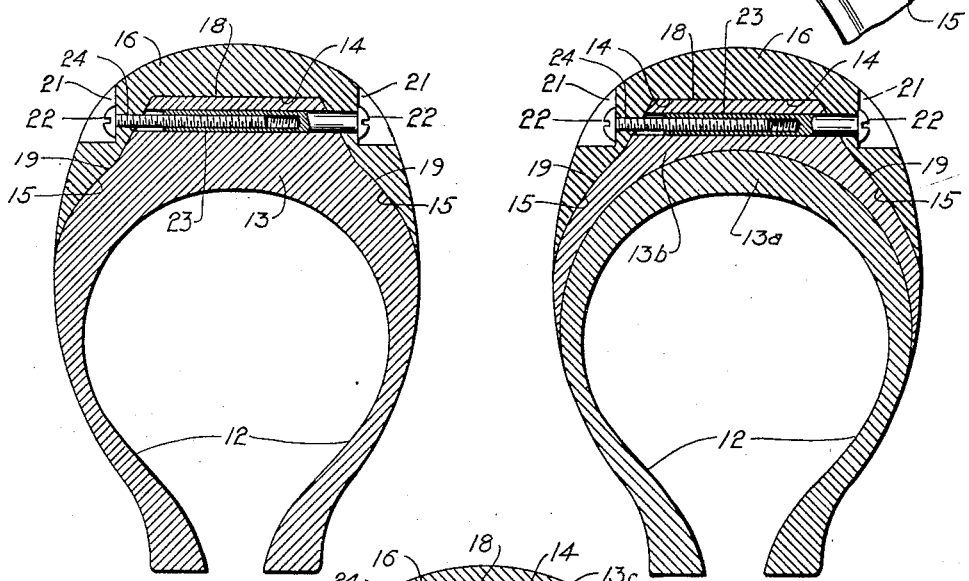
Fig. 2
Fig. 3
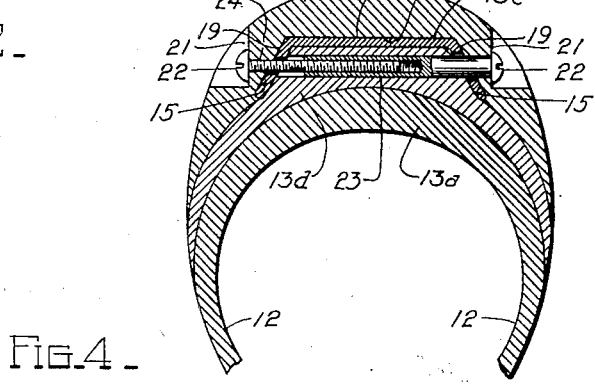
Fig. 4
Inventor:
ELLIOTT M STORY

UNITED STATES PATENT OFFICE.

ELLIOTT M. STORY, OF BRAINTREE, MASSACHUSETTS.

PNEUMATIC TIRE.

1,336,663. Specification of Letters Patent. Patented Apr. 13, 1920.

Application filed November 10, 1919. Serial No. 336,891.

*To all whom it may concern:*

Be it known that I, ELLIOTT M. STORY, a citizen of the United States, residing at Braintree, in the county of Norfolk and State of Massachusetts, have invented new and useful Improvements in Pneumatic Tires, of which the following is a specification.

This invention relates to a tire shoe detachably secured to a wheel rim and inclosing an inflatable inner tube, the shoe being provided with a detachable tread band adapted to be removed when worn, and replaced by a new band.

The invention is embodied in the described improvements in the form and construction of the shoe and tread band, and in the means for detachably connecting said parts hereinafter described and claimed.

Of the accompanying drawings forming a part of this specification,—

Figure 1 is a side view of a portion of a tire shoe embodying the invention.

Fig. 2 is a section on line 2—2 of Fig. 1.

Figs. 3 and 4 are views similar to Fig. 2, showing different embodiments of the invention.

The same reference characters include the same parts in all of the figures.

The shoe includes the usual side portions 12, adapted at their inner edges to be engaged with a wheel rim, and a thickened central portion connecting the side portions, the whole constituting what I call the body, whether the central portion be made in one part, as shown by Fig. 2, or in a plurality of parts or elements, as shown by Figs. 3 and 4.

Referring first to Fig. 2, the said thickened central portion designated as a whole by 13, is integral with the side portions 12, and is provided with a central external peripheral face 14, and external peripheral side faces 15, oppositely inclined in cross section relatively to the central face, and intersecting the latter, the faces 14 and 15 constituting a salient tread band seat. 16 represents a resilient tread band, preferably made in sections, the meeting ends of which are shown at 17 (Fig. 1). Said band has a central internal face 18, fitting the external face 14, and inclined internal faces 19, fitting the faces 15, said faces 18 and 19 constituting a reëntrant internal surface interengaged with the salient external surfaces of the body to oppose lateral displacement of the tread band. The external or tread surface of the tread band meets the external surfaces of the side portions 12, the portions of the tread band having the inclined internal faces 19, constituting flanges which overlap the faces 15.

The central portion 13 of the body and the flanges of the tread band are provided with coinciding transverse orifices, the orifices in said flanges being enlarged at their outer ends to provide outwardly facing shoulders 21. In said orifices are inserted transverse bolts having clamping heads 22, bearing on the shoulders 21. The bolts are preferably telescopic, each being composed of an internally threaded member 23 and an externally threaded member 24. Each of said members is provided with a head 22, and said heads are slotted to engage a screw-driver. The heads 22 are, therefore, adjustable toward each other by suitably manipulating the bolt members, to clamp the band flanges against the inclined faces 15. When the bolt members are withdrawn, the tread band, or any section thereof, may be readily removed. If desired, the faces 19 may be additionally secured to the faces 15 by cement, in which case, the removal of the tread band involves the rupturing of the cement connection.

As shown by Fig. 3, the central portion of the body may be composed of an inner element $13^a$, integral with the side portions 12, and an outer element $13^b$, detachably secured by cement, or otherwise, to the inner element, and provided with the faces 14 and 15, and with transverse bolt-receiving orifices. In case the tread band 16 is worn through, and the outer element $13^b$ is also so worn as to impair its usefulness, the said outer element may be removed and a new element substituted therefor.

As shown by Fig. 4, the outer element may be of compound construction, comprising an outer layer $13^c$, which may be a puncture proof metal reinforcing band secured to an inner layer $13^d$, cemented, vulcanized, or otherwise secured to the inner element $13^a$. The outer layer $13^c$ is provided with the faces 14 and 15, and with bolt-receiving orifices, and constitutes a shield adapted to prevent the puncturing of the central portion of the body.

The body structure, including the parts 12 and $13^a$, may be the result of the removal of the worn tread portion of an ordinary tire shoe, to form the external surface of the parts 13ª, and said structure may then be retreaded by vulcanizing, or otherwise securing thereto, either the outer element 13ᵇ, or the compound outer element 13ᵈ, 13ᵉ, and then applying the tread band 16 to said outer element.

It will be seen that the structure described is well adapted for the production of a tire having a convex tread face meeting the sides of the body of the tire, without angles or corners, a form which is at present popular.

I claim:

A tire shoe comprising a body having side portions and a thickened central portion, the external surface of which has a central transverse face and inclined side faces, said faces collectively forming a salient tread band seat, the inclined side faces of which join the outer surfaces of the side portions of the body, a flexible tread band, the internal surface of which has a central transverse face and inclined side faces, said faces collectively forming a reëntrant internal surface fitting said salient seat and interengaged therewith to oppose lateral displacement of the tread band, the external surface of the tread band being convex and meeting the external surfaces of the side portions of the body, said central portion and tread band having coinciding transverse orifices extending substantially parallel with the central transverse faces thereof, the orifices in the tread band being provided with outwardly facing shoulders, and transverse bolts inserted in said orifices, and having clamping heads adjustable relatively to each other and bearing on said shoulders to clamp the inclined internal faces of the tread band against the inclined external faces of the body.

In testimony whereof I have affixed my signature.

ELLIOTT M. STORY.